US012743757B2

(12) United States Patent
Luo et al.

(10) Patent No.: US 12,743,757 B2
(45) Date of Patent: Sep. 22, 2026

(54) METHOD, APPARATUS, ELECTRONIC DEVICE, AND STORAGE MEDIUM FOR SELF-ADAPTIVE LUT GENERATION

(71) Applicants: VERISILICON MICROELECTRONICS (SHANGHAI) CO., LTD., Shanghai (CN); VERISILICON MICROELECTRONICS (CHENGDU) CO., LTD., Chengdu (CN)

(72) Inventors: Kunxin Luo, Shanghai (CN); Song Li, Shanghai (CN)

(73) Assignees: VERISILICON MICROELECTRONICS (SHANGHAI) CO., LTD., Shanghai (CN); VERISILICON MICROELECTRONICS (CHENGDU) CO., LTD., Sichuan (CN)

( * ) Notice: Subject to any disclaimer, the term of this patent is extended or adjusted under 35 U.S.C. 154(b) by 363 days.

(21) Appl. No.: 18/282,582

(22) PCT Filed: Aug. 31, 2022

(86) PCT No.: PCT/CN2022/116254

§ 371 (c)(1),
(2) Date: Sep. 18, 2023

(87) PCT Pub. No.: WO2024/045060

PCT Pub. Date: Mar. 7, 2024

(65) Prior Publication Data

US 2025/0078226 A1 Mar. 6, 2025

(51) Int. Cl.
*G06T 5/92* (2024.01)

(52) U.S. Cl.
CPC .................................... *G06T 5/92* (2024.01)

(58) Field of Classification Search
CPC .... G06T 5/92; G06T 1/60; G06T 1/20; G06T 7/00; G06F 16/22
See application file for complete search history.

(56) References Cited

U.S. PATENT DOCUMENTS 6,418,281 B1 * 7/2002 Ohki .................. H04N 1/4078 358/300
2006/0030313 A1 2/2006 Massie et al.
(Continued)

FOREIGN PATENT DOCUMENTS

CN 102413268 A 4/2012
CN 103440656 A 12/2013
(Continued)

OTHER PUBLICATIONS

Dong-U Lee et al., “A Flexible Architecture for Precise Gamma Correction”, IEEE Transactions on Very Large Scale Integration (VLSI) Systems, vol. 15, No. 4, Apr. 2007 (Apr. 2007), pp. 474-478. (Year: 2007).*

(Continued)

*Primary Examiner* — Samir A Ahmed
(74) *Attorney, Agent, or Firm* — BCF LLP

(57) ABSTRACT

The present disclosure provides a method, apparatus, electronic device, and storage medium for self-adaptive LUT generation. The method includes: obtaining the target discrete function configured in a specific functional unit for task processing, processing the target discrete function to obtain the first-order derivative of the target discrete function, determining the coordinates of the segment points of the target discrete function based on the first-order derivative and the preset number of segments, and generating an LUT based on the coordinates of the segment points of the target discrete function. With this method, LUTs can be
(Continued)

automatically generated based on the target discrete function with high efficiency. Determining the segment points of the target discrete function using the aforementioned method also improves the accuracy of the LUTs.

18 Claims, 6 Drawing Sheets

(56) References Cited

U.S. PATENT DOCUMENTS

2006/0203313 A1* 9/2006 Chiu ..................... G06T 5/92 358/530
2015/0187094 A1 7/2015 Lee et al.
2016/0093243 A1 3/2016 Su
2021/0383515 A1* 12/2021 Chakrabarty ......... G06T 11/206

FOREIGN PATENT DOCUMENTS

CN 113407788 A 9/2021
CN 114357375 A 4/2022
CN 114390157 A 4/2022
JP H08102865 A 4/1996
JP 2003224740 A * 8/2003
JP 2005518158 A * 6/2005 ............. H04N 5/202
WO WO-02076085 A1 * 9/2002 ......... H04N 1/00954
WO WO-03069895 A1 * 8/2003 ............. H04N 5/202

OTHER PUBLICATIONS

International Search Report and Written Opinion with regard to PCT/CN2022/116254 mailed Mar. 17, 2023.
English Abstract for CN102413268 retrieved on Espacenet on Sep. 19, 2023.
English Abstract for CN114390157 retrieved on Espacenet on Sep. 19, 2023.
English Abstract for CN114357375 retrieved on Espacenet on Sep. 19, 2023.
English Abstract for CN113407788 retrieved on Espacenet on Sep. 19, 2023.
English Abstract for CN103440656 retrieved on Espacenet on Sep. 19, 2023.
Decision to Grant with regard to the counterpart JP Patent Application No. 2023-550080 mailed Jan. 7, 2020.
Office Action with regard to the counterpart JP Patent Application No. 2023-550080 mailed Oct. 15, 2020.
Office Action with regard to the counterpart KR Patent Application No. 10-2023-7042130 mailed Sep. 11, 2025.

* cited by examiner

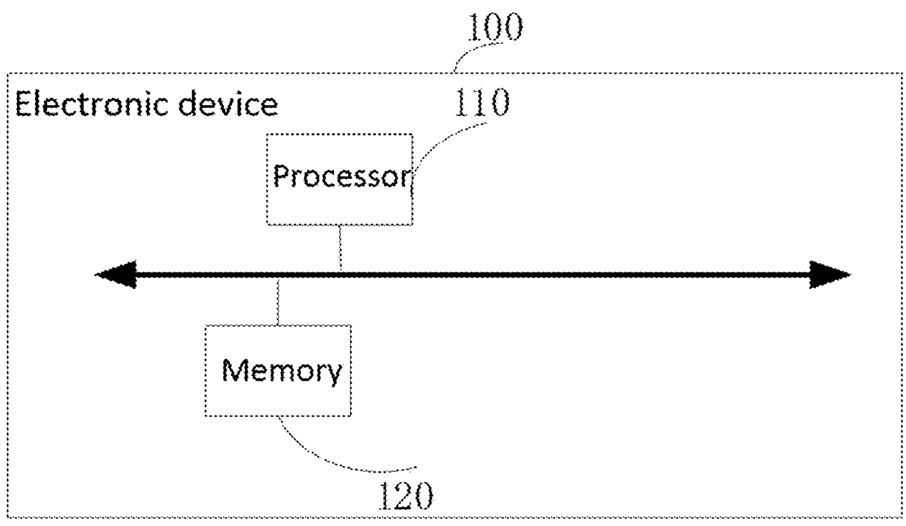

FIG. 1

Start

Obtaining the target discrete function configured in a specific functional unit for task processing — S101

Processing the target discrete function to obtain the first-order derivative of the target discrete function — S102

Determining the coordinates of the segment points of the target discrete function based on the first-order derivative and the preset number of segments — S103

Generating an LUT based on the coordinates of the segment points of the target discrete function — S104

End

FIG. 2

METHOD, APPARATUS, ELECTRONIC DEVICE, AND STORAGE MEDIUM FOR SELF-ADAPTIVE LUT GENERATION

TECHNICAL FIELD

The present disclosure relates to the field of chip design, and in particular, to a method and an apparatus for self-adaptive LUT generation, an electronic device, and a storage medium.

BACKGROUND ART

The high dynamic range (HDR) module of an image signal processor (ISP) adjusts the pixel values of an image by using transfer curves such as optical-electro transfer function (OETF) and electro-optical transfer function (EOTF). An ISP usually uses lookup tables (LUTs) for interpolation on any point of a curve.

In order to describe LUTs with a small number of register resources while reducing the time complexity of LUT algorithms, three parameters, namely "Count", "Steps", and "Points" are used to describe LUT distribution. Herein, "Count" indicates the number of segments on the curve. "Steps" indicates the interval of sampling points in each segment. "Points" indicates the x-coordinates of the points that divide the curve into segments.

At present, LUT generation generally comprises manual curve observation and manual sampling point setting. The generated LUT is then configured in a specific functional unit (such as the aforementioned ISP). This approach is time consuming and LUTs generated this way are low in accuracy.

SUMMARY

Embodiments of the present disclosure aims at providing a method, apparatus, electronic device, and storage medium for self-adaptive LUT generation so as to improve the generation accuracy and efficiency.

The present disclosure is implemented as follows:

In the first aspect, an embodiment of the present disclosure provides a self-adaptive LUT generation method, including: obtaining the target discrete function configured in a specific functional unit for task processing, processing the target discrete function to obtain the first-order derivative of the target discrete function, determining the coordinates of the segment points of the target discrete function based on the first-order derivative and the preset number of segments, and generating an LUT based on the coordinates of the segment points.

In an embodiment of the present disclosure, the first-order derivative of the target discrete function is obtained by processing the target discrete function. Then, the coordinates of the segment points of the target discrete function are determined based on the first-order derivative and the preset number of segments. Finally, an LUT is generated based on the coordinates of the segment points of the target discrete function. With this method, LUTs can be automatically generated based on the target discrete function with high efficiency. Determining the segment points of the target discrete function using the aforementioned method also improves the accuracy of the LUTs.

With reference to the technical solution provided in the first aspect, in some possible implementations, determining the coordinates of the segment points of the target discrete function based on the first-order derivative and the preset number of segments includes: evenly segmenting the y-axis of the first-order derivative based on the preset number of segments; determining the coordinates of the segment points of the target discrete function based on the coordinates of the segment points of the first-order derivative, wherein the coordinates of the segment points of the first-order derivative are the coordinates of the segment points of the target discrete function; the coordinates of the segment points of the first-order derivative are obtained by evenly segmenting the x-axis of the inverse function of the first-order derivative based on the preset number of segments.

In an embodiment of the present disclosure, the inverse function of the first-order derivative is calculated so that the coordinates of each segment point on the y-axis can be accurately and conveniently determined. The segment points on the y-axis are then mapped to the x-axis so that the segment points on the x-axis are obtained.

In some possible implementations, the target discrete function consists of N discrete data points. With reference to the technical solution provided in the first aspect, determining the coordinates of segment points of the target discrete function based on the coordinates of segment points of the first-order derivative includes: moving the segment points of the first-order derivative to data points of the first-order derivative to obtain the target segment points of the first-order derivative, wherein the target segment points of the first-order derivative are in the same order as the segment points of the first-order derivative; the coordinates of the target segment points of the first-order derivative are the coordinates of the segment points of the target discrete function.

In an embodiment of the present disclosure, the coordinates of the target segment points of the first-order derivative are obtained by moving the segment points of the first-order derivative to data points of the first-order derivative. This approach can simplify subsequent calculations and improve efficiency.

With reference to the technical solution provided in the first aspect, in some possible implementations, moving the segment points of the first-order derivative to data points of the first-order derivative to obtain the target segment points of the first-order derivative includes: determining whether the segment points of the first-order derivative are on the data points; if a segment point is on a data point, the segment point is determined as a target segment point of the first-order derivative; if not, the segment point is moved to a data point, so that the segment point at the new location is determined as the target segment point of the first-order derivative.

With reference to the technical solution provided in the first aspect, in some possible implementations, after moving the segment points of the first-order derivative to data points of the first-order derivative to obtain the target segment points of the first-order derivative, the method further includes: evenly segmenting the y-axis of the first-order derivative to the right side of a target segment point to form new segment points, and determining these new segment points as segment points of the first-order derivative. The number of even segments on y-axis is the preset number of segments minus m, and m equals the number of segmentation times minus 1.

With reference to the technical solution provided in the first aspect, in some possible implementations, determining the coordinates of the segment points of the target discrete function based on the first-order derivative and the preset number of segments includes: determining the coordinates of the initial segment points of the first-order derivative based on the first-order derivative and the preset number of segments; judging whether the difference between the coordinates of two adjacent initial segment points in the first-order derivative is a power of two; if it is not, a new segment point is inserted between the adjacent initial segment points, so that the difference between the coordinates of any two adjacent segment points after the insertion is a power of two. The coordinates of the segment points of the target discrete function are then determined, wherein the segment points of the target discrete function include the initial segment points on the first-order derivative and the new segment points on the first-order derivative.

In an embodiment of the present disclosure, the above method is used to adjust the segment points so that the difference between the coordinates of any two adjacent segment points is a power of two, and division operation can be avoided in subsequent interpolation.

With reference to the technical solution provided in the first aspect, in some possible implementations, after determining the coordinates of the segment points of the target discrete function, the method also includes: finding the x-coordinate where the data point of the target discrete function has a greatest difference from the segment point-based interpolation result; adding a sampling point to the segment where the x-coordinate is located, wherein the sampling point divides the interval of the segment in half; the endpoints of the segment are two adjacent segment points; the interval of the segment indicates the distance between two adjacent sampling points; initially, the interval of the segment indicates the distance between two segment points; after finding the x-coordinate where the data point of the target discrete function has a greatest difference from the segment point-based interpolation result, a sampling point is added to the segment where the x-coordinate is located, wherein the sampling point divides the interval of the segment in half.

In an embodiment of the present disclosure, the accuracy of the subsequently generated LUT can be improved using the aforementioned secondary point insertion approach, while eliminating the need for adding new segment points.

With reference to the technical solution provided in the first aspect, in some possible implementations, the method also includes determining whether the number of sampling points reaches the preset number; if the preset number is not reached, the x-coordinate where the data point of the target discrete function has a greatest difference from the segment point-based interpolation result will continue to be found. Then, a sampling point will be added on the segment of the x-axis where the greatest difference occurs, wherein the sampling point divides the interval of the segment in half.

With reference to the technical solution provided in the first aspect, in some possible implementations, the LUT is generated based on the coordinates of the segment points of the target discrete function, including: generating the LUT based on the coordinates of the segment points of the target discrete function and the interval of each segment.

With reference to the technical solution provided in the first aspect, in some possible implementations, generating the LUT based on the coordinates of the segment points of the target discrete function and the interval of each segment includes: judging whether the intervals of two adjacent segments are the same in length; if they are the same, the segment point between the two adjacent segments is deleted. The LUT is generated based on the coordinates of the remaining segment points of the target discrete function and the interval of each remaining segment.

In an embodiment of the present disclosure, register resources can be saved by deleting the segment point between two adjacent segments with equal intervals.

In the second aspect, an embodiment of the present disclosure provides a self-adaptive LUT generation apparatus, including: an acquisition module for acquiring the target discrete function configured in a specific functional unit for task processing, a processing module for processing the target discrete function to obtain the first-order derivative of the target discrete function, a determination module for determining the coordinates of the segment points of the target discrete function based on the first-order derivative and the preset number of segments, and a generation module for generating an LUT based on the coordinates of segment points of the target discrete function.

With reference to the technical solution provided in the second aspect, in some possible implementations, the determination module is specifically used for evenly segmenting the y-axis of the first-order derivative based on the preset number of segments; determining the coordinates of the segment points of the target discrete function based on the coordinates of the segment points of the first-order derivative, wherein the coordinates of the segment points of the first-order derivative are the coordinates of the segment points of the target discrete function; the coordinates of the segment points of the first-order derivative are obtained by evenly segmenting the x-axis of the inverse function of the first-order derivative based on the preset number of segments.

In some possible implementations, the target discrete function contains N discrete data points. With reference to the technical solution provided in the second aspect, the determination module is also used for moving the segment points of the first-order derivative to data points of the first-order derivative to obtain the target segment points of the first-order derivative, wherein the target segment points of the first-order derivative are in the same order as the segment points of the first-order derivative; the coordinates of the target segment points of the first-order derivative are the coordinates of the segment points of the target discrete function.

With reference to the technical solution provided in the second aspect, in some possible implementations, the determination module is further used for determining whether the segment points of the first-order derivative are on the data points; if a segment point is on a data point, the segment point is determined as a target segment point of the first-order derivative; if not, the segment point is moved to a data point, so that the segment point at the new location is determined as the target segment point of the first-order derivative.

With reference to the technical solution provided in the second aspect, in some possible implementations, the determination module is also used for moving the segment points of the first-order derivative to the data points of the first-order derivative. After the target segment points of the first-order derivative are obtained, the y-axis of the first-order derivative to the right of the target segment points will be evenly segmented to form new segment points. The new segment points are then determined as the segment points of the first-order derivative. The number of even segments on y-axis is the preset number of segments minus m, and m equals the number of segmentation times minus 1.

With reference to the technical solution provided in the second aspect, in some possible implementations, the determination module is further responsible for determining the coordinates of the initial segment points of the target discrete function based on the first-order derivative and the preset number of segments. The determination module also judges whether the difference between the coordinates of two adjacent initial segment points in the first-order derivative is a power of two. If it is not, a new segment point is inserted between the adjacent initial segment points, so that the difference between the coordinates of any two adjacent segment points after the insertion of the new segment point is a power of two. This module then determines the coordinates of the segment points of the target discrete function, wherein the segment points of the target discrete function include the initial segment points on the first-order derivative and the new segment points on the first-order derivative.

With reference to the technical solution provided in the second aspect, in some possible implementations, the device also includes a secondary point insertion module. After the coordinates of the segment points of the target discrete function are determined, this secondary point insertion module finds the x-coordinate where the data point of the target discrete function has a greatest difference from the segment point-based interpolation result. The module then adds a sampling point to the segment where the x-coordinate is located, wherein the sampling point divides the interval of the segment in half. The endpoints of the segment are two adjacent segment points; the interval of the segment indicates the distance between two adjacent sampling points. Initially, the interval of the segment indicates the distance between two segment points; after finding the x-coordinate where the data point of the target discrete function has a greatest difference from the segment point-based interpolation result, a sampling point is added to the segment where the x-coordinate is located, wherein the sampling point divides the interval of the segment in half.

With reference to the technical solution provided in the second aspect, in some possible implementations, the secondary point insertion module determines whether the number of sampling points reaches the preset number; if the preset number is not reached, the x-coordinate where the data point of the target discrete function has a greatest difference from the segment point-based interpolation result will continue to be found. Then, a sampling point will be added on the segment of the x-axis where the greatest difference occurs, wherein the sampling point divides the interval of the segment in half.

With reference to the technical solution provided in the second aspect, in some possible implementations, the generation module is used for generating an LUT based on the coordinates of the segment points of the target discrete function and the interval of each segment.

With reference to the technical solution provided in the second aspect, in some possible implementations, the generation module is also used for judging whether the intervals of two adjacent segments are the same in length; if they are the same, the segment point between the two adjacent segments is deleted. The LUT is generated based on the coordinates of the remaining segment points of the target discrete function and the interval of each remaining segment.

In the third aspect, an embodiment of the present disclosure provides an electronic device, including a processor and a memory, wherein the processor and the memory are connected; the memory is used for storing programs; the processor is used for calling the programs stored in the memory, and executes the method in accordance with the embodiments of the first aspect and/or some possible implementations with reference to the embodiments of the first aspect.

In the fourth aspect, an embodiment of the present disclosure provides a computer-readable storage medium on which a computer program is stored. The computer program executes the method in accordance with the embodiments of the first aspect and/or some possible implementations with reference to the embodiments of the first aspect when the program is run by a processor.

BRIEF DESCRIPTION OF THE DRAWINGS

In order to more clearly illustrate the technical solutions of the embodiments of the present disclosure, the drawings that need to be used in the embodiments are briefly introduced below. It is to be understood that the following drawings illustrate only certain embodiments of the present disclosure, and are therefore not to be construed as a limitation to its scope. For those skilled in the art, other related drawings may be obtained from these drawings without any creative efforts.

FIG. 1 is a block diagram of an electronic device in accordance with an embodiment of the present disclosure;

FIG. 2 is a flowchart depicting the steps of self-adaptive LUT generation in accordance with an embodiment of the present disclosure;

Figure 3:
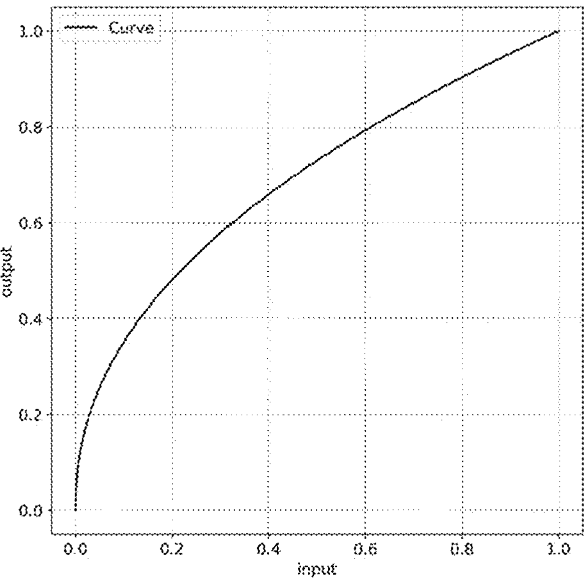
FIG. 3 shows the curve of the gamma function in accordance with an embodiment of the present disclosure.

Reference Numbers: 100—electronic device; 110—processor; 120—memory; 200—self-adaptive LUT generation apparatus; 210—acquisition module; 220—processing module; 230—determination module; 240—generation module.

DETAILED DESCRIPTION OF EMBODIMENTS

The technical solution of the embodiments of the present disclosure will be described below with reference to the drawings in the embodiments of the present disclosure.

FIG. 1 is a schematic block diagram of the electronic device 100 for self-adaptive LUT generation in accordance with an embodiment of the present disclosure. In an embodiment of the present disclosure, the electronic device 100 may be a terminal or a server, and the terminal may be, but not limited to, a personal computer (PC), a smartphone, a tablet, a personal digital assistant (PDA), or a mobile Internet device (MID). The server may be, but not limited to, a network server, a database server, a cloud server, or a cluster composed of multiple sub-servers. It will be readily understood that the list of devices provided above only intends to facilitate the understanding of the embodiments of the present disclosure, and are therefore not to be construed as a limitation to its scope.

The electronic device 100 may comprise a processor 110 and memory 120.

Processor 110 and memory 120 are electrically connected directly or indirectly for data transmission or interaction. For example, these elements may be electrically connected to each other through one or more communication buses or signal lines. A self-adaptive LUT generation apparatus contains at least one software module that can be stored in the memory 120 in the form of software or solidified in the operating system (OS) of the electronic device 100 in the form of firmware. The processor 110 executes the executable modules stored in the memory 120 to realize self-adaptive LUT generation. The executable modules may be functional software modules and computer programs of the self-adaptive LUT generation apparatus. The processor 110 may execute computer programs after receiving instructions.

Herein, the processor 110 may be an integrated circuit chip with signal processing capability. The processor 110 may also be a general-purpose processor. For example, it may be a central processing unit (CPU), a digital signal processor (DSP), a disclosure specific integrated circuit (ASIC), a discrete gate, a transistor logic device, or a discrete hardware component, which can implement or execute the methods, steps, and logic diagrams disclosed in the embodiments of the disclosure. In addition, the general-purpose processor may be a microprocessor or any conventional processor or the like.

The memory 120 may be, but not limited to, random access memory (RAM), read only memory (ROM), programmable read-only memory (PROM), erasable programmable read-only memory (EPROM), or electric erasable programmable read-only memory (EEPROM). The memory 120 is used to store a program, and the processor 110 executes the program after receiving the instruction.

It should be noted that the structure shown in FIG. 1 is for illustrative purpose only. The electronic device 100 provided in accordance with an embodiment of the present disclosure may have fewer or more components than shown in FIG. 1 or have a configuration different from that shown in FIG. 1. In addition, the components shown in FIG. 1 may be implemented in software, hardware, or a combination of hardware and software.

FIG. 2 is a flowchart depicting the steps of self-adaptive LUT generation in accordance with an embodiment of the present disclosure, and the electronic device 100 shown in FIG. 1 is used. It should be noted that the sequence of the steps of self-adaptive LUT generation in accordance with an embodiment of the present disclosure may be different from that shown in FIG. 2 or that depicted below, which includes Step 101 to Step 104.

Step 101: obtaining the target discrete function configured in a specific functional unit for task processing.

The specific functional unit may be a graphics processing unit (GPU), an image display chip, a voice processor, etc. Accordingly, task processing may include, but is not limited to, image processing or voice processing.

It should be noted that the target discrete function is derived by discretizing the original target function. Since the specific functional unit generally converts floating-point numbers to fixed-point numbers, the original target function can be sampled evenly. For example, the original target function can be discretized into N data points, where $N=2^n+1$ (n=1, 2, 3, . . . ). In an embodiment of the present disclosure, n may be 10, in which case $N=2^{10}+1=1025$. In this expression, 1 is added to include 0.

The discretization of the original target function may be implemented by an electronic device. That is, before Step 101, the method includes obtaining the original target function, discretizing the original target function, and generating the target discrete function.

It will be readily understood that, in other embodiments, the discretization of the original target function may also be implemented by other electronic devices, whereas the electronic device in accordance with an embodiment of the present disclosure is only used for obtaining the discretized target discrete function.

The aforementioned original target function is mainly used in task processing. For example, when the original target function is used in image processing, it can be either an OETF or an EOTF. The original target function may be, but not limited to, a gamma or a de-gamma function.

In order that the present invention will be more readily understood, the description of the embodiment takes gamma function as the original target function.

Expression (1) is the expression of the gamma function:

$$f(x) = x^{\frac{1}{2.2}},\ 0 \le x \le 1 \tag{1}$$

FIG. 3 depicts the curve of the gamma function, wherein the horizontal axis is the x-axis which indicates the input, while the vertical axis is the y-axis which indicates the output.

Expression (2) is the expression of the discretized gamma function (i.e., the target discrete function):

$$f(x) = \left(\frac{x}{(N-1)}\right)^{\frac{1}{2.2}},\ x = 0, 1, 2, \dots , N-1 \tag{2}$$

Figure 4:
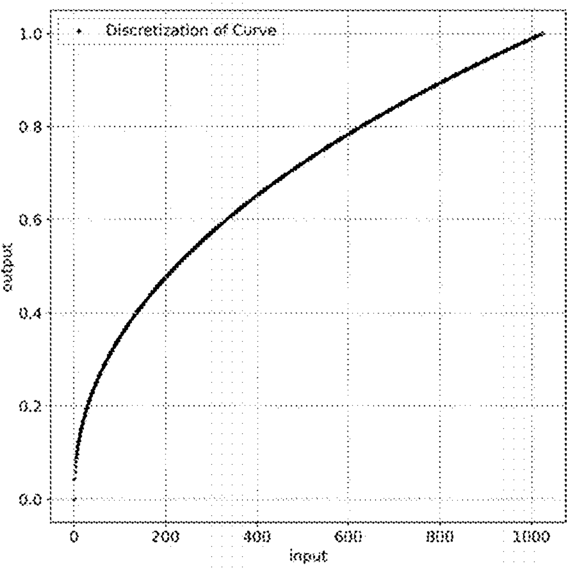
FIG. 4 is a schematic diagram of the discretized gamma function in accordance with an embodiment of the present disclosure.

FIG. 4 illustrates the curve of the discretized gamma function (i.e., the target discrete function), wherein "discretization of curve" indicates the discretized curve. The gamma function curve is discretized into 1025 discrete points, which can be clearly seen when x approximates 0.

Step 102: processing the target discrete function to obtain the first-order derivative of the target discrete function.

It should be noted that where the slope of the curve changes more quickly, more segment points are needed, and the first-order derivative can represent the change rate of the function. Therefore, in an embodiment of the present disclosure, the first-order derivative of the target discrete function is derived by taking the derivative of the target discrete function.

The first-order derivative of the target discrete function can be obtained using expression (3) as follows:

$$f'(x) = \frac{df}{dx} = f(x+1) - f(x) \tag{3}$$

Figure 5:
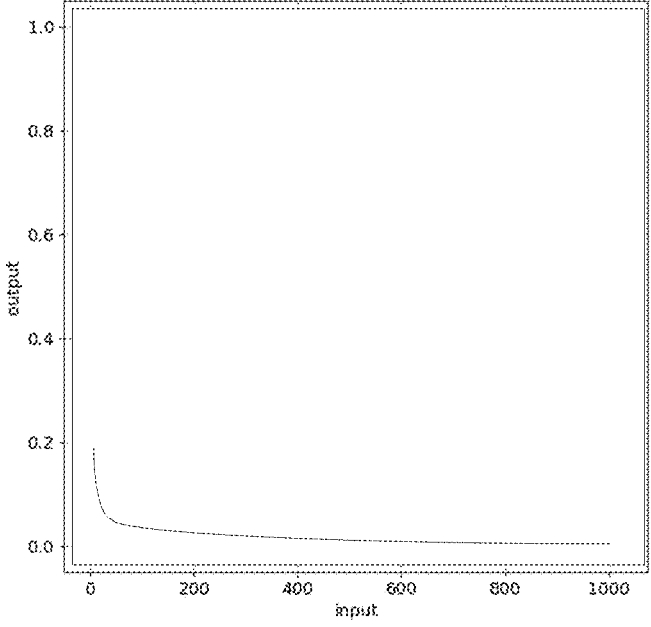
FIG. 5 is a schematic diagram of the first-order derivative of the discretized gamma function in accordance with an embodiment of the present disclosure.

FIG. 5 shows the first-order derivative of the discretized gamma function.

Step 103: determining the coordinates of the segment points of the target discrete function based on the first-order derivative and the preset number of segments.

The number of preset segments may be configured to 8, 10, or other values based on actual situation.

The preset number of segments is used when segmenting the first-order derivative, after which the coordinates of the segment points of the first-order derivative can be determined. The segment points of the first-order derivative are the same as those of the target discrete function.

Step 104: generating an LUT based on the coordinates of the segment points of the target discrete function.

Finally, an LUT can be generated based on the coordinates of the segment points of the target discrete function. In an embodiment of the present disclosure, the LUT can only include the coordinates of the segment points of each target discrete function.

In other embodiments, an LUT can also be generated as shown in Table 1.

TABLE 1

| | | | |
|---|---|---|---|
| Count | | 3 | |
| Steps | 1024 | 1024 | 2048 |
| Points | 1024 | 2048 | 4096 |

In Table 1, "Count" denotes the number of segments, "Steps" denotes the interval between sampling points in each segment, and "Points" denotes the x-coordinate of each segment point of the target discrete function.

"Count" can be determined by the number of segment points of the target discrete function. For example, if the number of segment points of the target discrete function is 3, then "Count" is 3. Since the current segment does not contain sampling points, "Steps" is the interval between two adjacent segment points. For example, the interval of the third segment equals: 4096−2048=2048.

Figure 6:
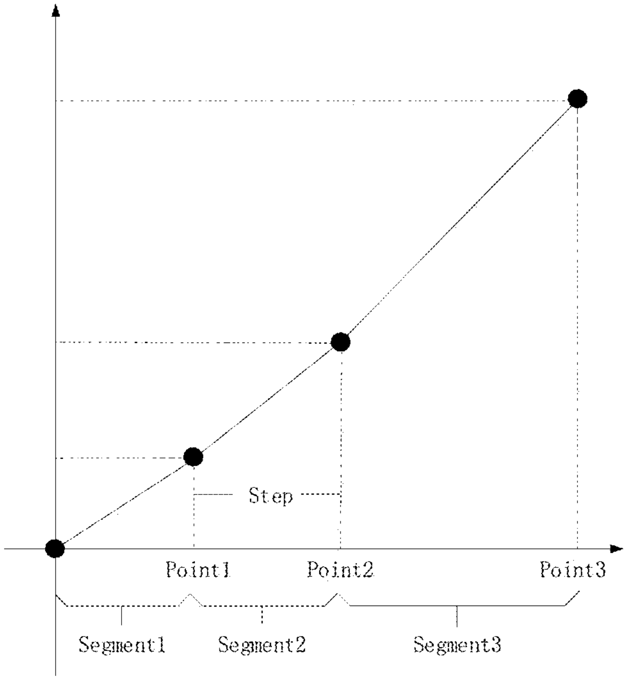
FIG. 6 is a schematic diagram of the function corresponding to Table 1 in accordance with an embodiment of the present disclosure.

A schematic diagram of the function corresponding to Table 1 can be seen in FIG. 6. In FIG. 6, Point 1=1024, Point 2=2048, and Point 3=4096. The original target function is divided into three segments, so "Count" equals 3, and the three segments are Segment 1, Segment 2, and Segment 3, respectively.

In addition, it should be noted that the LUT also includes the y-coordinate of each segment point, which can be determined based on the x-coordinate of each segment point, the details of which is not described here.

The LUT can be configured in a specific functional unit, so that the specific functional unit can process tasks based on the LUT. That is, the target discrete function is configured in a specific functional unit via the LUT.

Specifically, the LUT generated using the method for self-adaptive LUT generation in accordance with an embodiment of the present disclosure can fit any monotonic curve. For example, the method may be used on an HDR module or other modules, which is not limited herein.

For example, the function corresponding to the LUTA is used for adjusting the pixel value of images. When the LUTA is configured in a specific functional unit, the specific functional unit can determine how the value of each pixel shall be adjusted according to the LUTA after receiving a frame of the image. The gray value of pixel A is used as the input of the function corresponding to the LUT. Then, an output of the function is obtained via interpolation. The output of the function is the adjusted value of pixel A.

It will be readily understood that in an embodiment of the present disclosure, the first-order derivative of the target discrete function is obtained by processing the target discrete function. Then, the coordinates of the segment points of the target discrete function are determined based on the first-order derivative and the preset number of segments. Finally, an LUT is generated based on the coordinates of the segment points of the target discrete function. With this method, LUTs can be automatically generated based on the target discrete function with high efficiency. Determining the segment points of the target discrete function using the aforementioned method also improves the accuracy of the LUTs.

In one embodiment, Step 103 as described above determines the coordinates of the segment points of the target discrete function based on the first-order derivative and the preset number of segments. This step may specifically include: evenly segmenting the y-axis of the first-order derivative based on the preset number of segments, and determining the coordinates of the segment points of the target discrete function based on the coordinates of the segment points of the first-order derivative.

Figure 7:
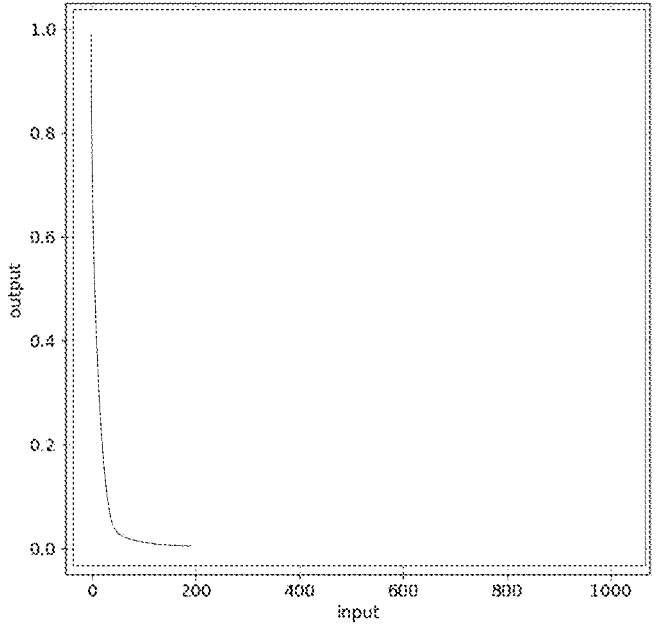
FIG. 7 is a schematic diagram of the inverse function of the first-order derivative of the discretized gamma function in accordance with an embodiment of the present disclosure.

The aforementioned coordinates of the segment points of the first-order derivative are the coordinates of the segment points of the target discrete function; the coordinates of the segment points of the first-order derivative are obtained by evenly segmenting the x-axis of the inverse function of the first-order derivative based on the preset number of segments. That is, before the y-axis of the first-order derivative is evenly segmented based on the preset number of segments, the first-order derivative of the target discrete function needs to be processed, so that the inverse function of the first-order derivative of the target discrete function is obtained. For example, if the target discrete function is a discretized gamma function, the inverse function of the first-order derivative of the target discrete function can be seen in FIG. 7.

Accordingly, in Step 102, the first-order derivative of the target discrete function and the inverse function of the first-order derivative of the target discrete function may be obtained simultaneously, which is not limited herein.

Figure 8:
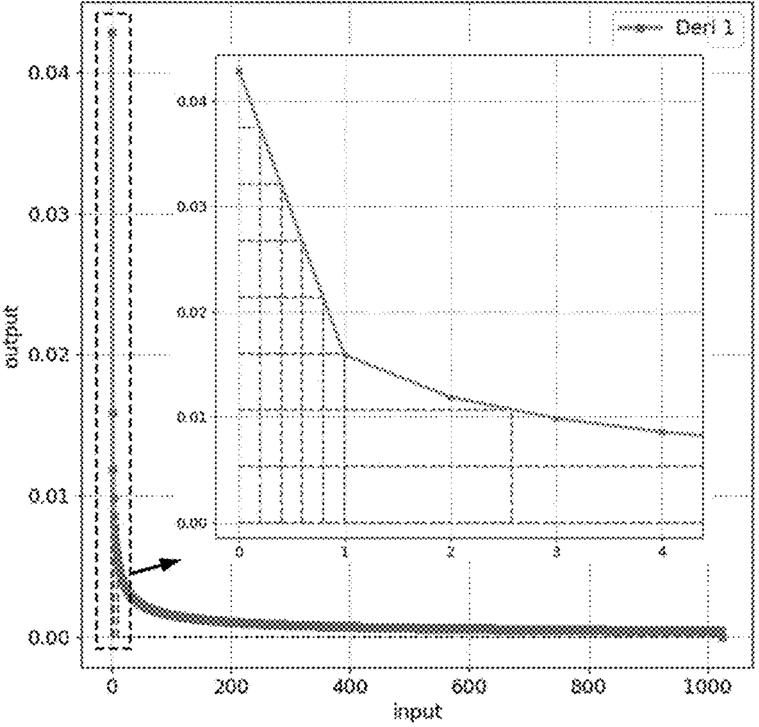
FIG. 8 is a schematic diagram of the first-order derivative with even segmentation of the y-axis in accordance with an embodiment of the present disclosure.

It should be noted that in an embodiment of the present disclosure, the y-axis of the first-order derivative needs to be evenly segmented. The x-axis segment points are then obtained based on the y-axis segment points. In this case, the y-axis segment points are used as inputs, thus the inverse function of the first-order derivative may be used for ease of calculation. That is, the x-axis of the inverse function of the first-order derivative is evenly segmented. The x-axis segment points are used as inputs, and the y-axis segment points are determined through linear interpolation. The x-axis segment points of the first-order derivative are then obtained. FIG. 8 is a schematic diagram of the first-order derivative with even segmentation of the y-axis based on the preset number of segments. In FIG. 8, the crossing of a horizontal dashed line and a vertical dashed line on the gray solid line denotes a segment point.

With reference to the above description, in an embodiment of the present disclosure, the inverse function of the first-order derivative is calculated so that the coordinates of each y-axis segment point can be accurately and conveniently determined. The y-axis segment points are then mapped to the x-axis so that the x-axis segment points are obtained.

It will be readily understood that in other embodiments, the segmentation of y-axis may also be performed directly based on the first-order derivative, which is not limited herein.

As shown in FIG. 8, a segment point may not be on a data point. Therefore, in order to simplify subsequent calculation and improve efficiency, in one embodiment, the aforementioned step of determining the coordinates of the segment points of the target discrete function based on the coordinates of the segment points of the first-order derivative may specifically include: moving the segment points of the first-order derivative to data points of the first-order derivative, so that the coordinates of the target segment points of the first-order derivative are obtained.

For example, the segment points of the first-order derivative may be sequentially moved to the data points closest to the right of the first-order derivative, so that the coordinates of the target segment points of the first-order derivative are obtained.

It should be noted that the order of the target segment points of the first-order derivative is the same as the order of the segment points of the first-order derivative. For example, Point 1, Point 2, and Point 3 are all segment points of the first-order derivative, wherein the x-coordinate of Point 1 is less than the x-coordinate of Point 2, and the x-coordinate of Point 2 is less than the x-coordinate of Point 3 ($X_{Point\ 1}<X_{Point\ 2}<X_{point\ 3}$). After the aforementioned movement, Point 1, Point 2, and Point 3 are the target segment points of the first-order derivative, and the relationship between them is still ($X_{Point\ 1}<X_{Point\ 2}<X_{Point\ 3}$).

The coordinates of the target segment points of the above first-order derivative are the coordinates of the segment points of the target discrete function.

Optionally, the aforementioned step of moving the segment points of the first-order derivative to the data points of the first-order derivative to obtain the target segment points of the first-order derivative may specifically include: determining whether the segment points of the first-order derivative are on the data points; if the said segment points are on the data points, the segment points of the first-order derivative are determined as the target segment points of the first-order derivative; if not, the segment points of the first-order derivative are moved to the data points of the first-order derivative, so that the target segment points of the first-order derivative are determined.

That is, when segment points of the first-order derivative fall on data points, the segment points will be directly used as target segment points. When segment points of the first-order derivative do not fall on data points, these segment points can be moved to the nearest data points to their right, so that the target segment points of the first-order derivative can be obtained.

In an embodiment of the present disclosure, after moving the segment points of the first-order derivative to the data points of the first-order derivative to obtain the target segment points of the first-order derivative, the method further includes: evenly segmenting the y-axis of the first-order derivative to the right of a target segment point to form new segment points, and determining the new segment points as the segment points of the first-order derivative. The number of even segments on y-axis is the preset number of segments minus m, and m equals the number of segmentation times minus 1.

For example, suppose the preset number of segments (Count) is 8. It is checked whether the first segment point of the first-order derivative falls on one of the N data points. If it falls on a data point, this segment point is used, that is, this first segment point is determined as the first target segment point. The second segment point will be checked in the same way.

If the first segment point does not fall on any of the N data points, this segment point is moved to the nearest data point to its right. In this case, the data point is determined as the first target segment point. At the same time, the y-axis of the first-order derivative to the right of the first target segment point is evenly resegmented. The number of segments is 7. That is, since the current time of segmentation is 2, m=2−1=1, and the number of segments is Count−m=8−1=7.

Figure 9:
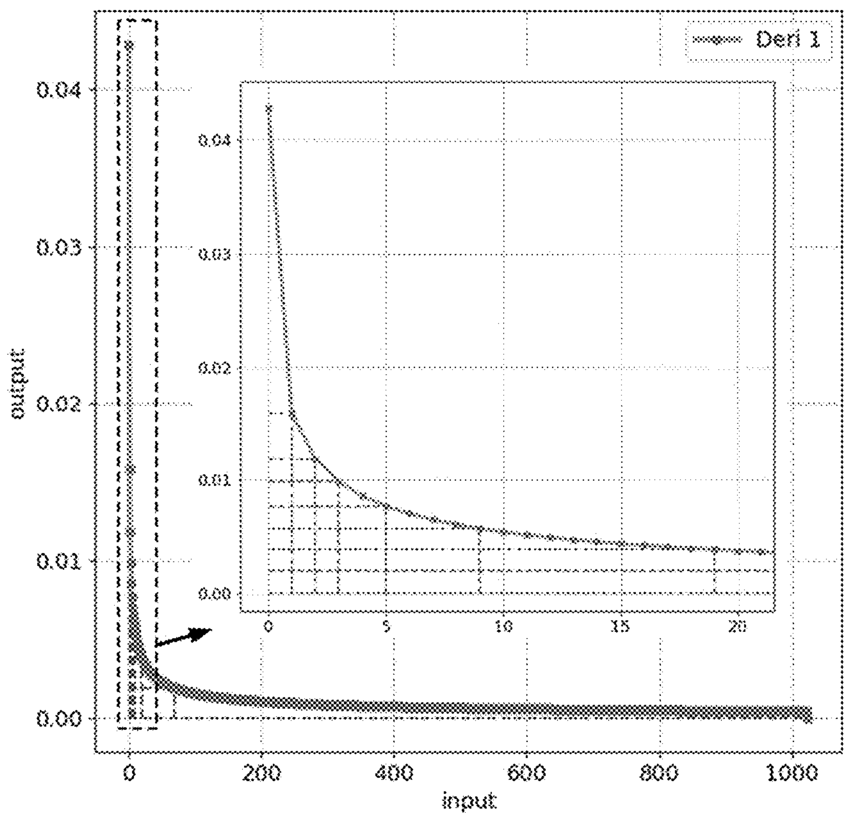
FIG. 9 is a schematic diagram of another first-order derivative with even segmentation of the y-axis in accordance with an embodiment of the present disclosure.

After resegmentation, it is checked whether the first segment point in the resegmented interval falls on one of the N data points. It should be noted that the first segment point in the resegmented interval is the second segment point during the first segmentation. The aforementioned steps of segmentation and judgment are repeated. Each time this step is repeated, the number of resegments will be subtracted by 1 until Count equals 0, and then the coordinates of all target segment points should be output. As shown in FIG. 9, all the segment points fall onto the data points. In this way, the y-axis of the first-order derivative is also evenly segmented.

Optionally, Step 103, determining the coordinates of the segment points of the target discrete function based on the first-order derivative and the preset number of segments, may yet include: determining the coordinates of the initial segment points of the first-order derivative based on the first-order derivative and the preset number of segments; determining whether the difference between the coordinates of two adjacent initial segment points on the first-order derivative is a power of two. If it is not, a new segment point is inserted between the adjacent initial segment points, so that the difference between the coordinates of any two adjacent segment points after the insertion of the new segment point is a power of two. The coordinates of the segment points of the target discrete function are then determined, wherein the segment points of the target discrete function include the initial segment points on the first-order derivative and the new segment points on the first-order derivative.

Specifically, the x-coordinate of the first segment point is recorded as adjPoint. Then, the interval between the adjacent segment point and the current segment point is calculated, and recorded as tempGap.

The interval tempGap will be checked to see if it is a power of two. If tempGap is a power of two, the process described in the remaining of this paragraph will be skipped. Otherwise, the nearest smaller number to tempGap that is a power of two will be found. The difference between the second segment point and the found number is saved to adjPoint. Then, tempGap will be divided by the found number, and the returned remainder will be checked to see if it is a power of two. If the answer is yes, the process ends. If not, the above process will be repeated until the remainder is a power of two. Finally, all the saved values of adjPoint are sorted from small to large.

For example, suppose the x-coordinate of the first segment point is 64, and 64 is saved to adjPoint. The coordinate of the second segment point is 3776, and 3776 is saved to adjPoint. The interval (tempGap) between the two points is 3712, which is not a power of two. Therefore, the nearest smaller number to 3712 that is a power of two, which is 2048 ($2^{11}$), is found. 3776−2048=1728, and 1728 is saved to adjPoint. 3712% 2048 (% returns the remainder of dividing the left hand operand by right hand operand) is 1664. Since 1664 is not a power of two, the above process will be repeated. The nearest smaller number to 1664 that is a power of two is 1024 ($2^{10}$). 1728−1024=704, and 704 is saved to adjPoint. 1664% 1024=640. Since 640 is not a power of two, the process continues. The nearest small number to 640 that is a power of two is 512 ($2^9$). 704−512=192, and 192 is saved to adjPoint. 640% 512=128, and 128 is a power of two. The process ends. Finally, all the saved values of adjPoint are sorted from small to large, which is adjPoints=[64, 192, 704, 1728, 3776], wherein 192, 704, and 1728 are the x-coordinates of the new segment points. The interval after the insertion of these segment points are 64, 128, 512, 1024, and 2048 respectively (adjSteps=[64, 128, 512, 1024, 2048]). Thus, it can be seen that the differences between the coordinates of any two segment points after the insertion of new segment points are a power of two.

The aforementioned steps are repeated until all the segment points are traversed so that all new segment points can be obtained. The new segment points are then combined with the initial segment points so that the coordinates of the segment points of the target discrete function can be determined. This approach eliminates the need for division operation in subsequent interpolation.

Figure 10:
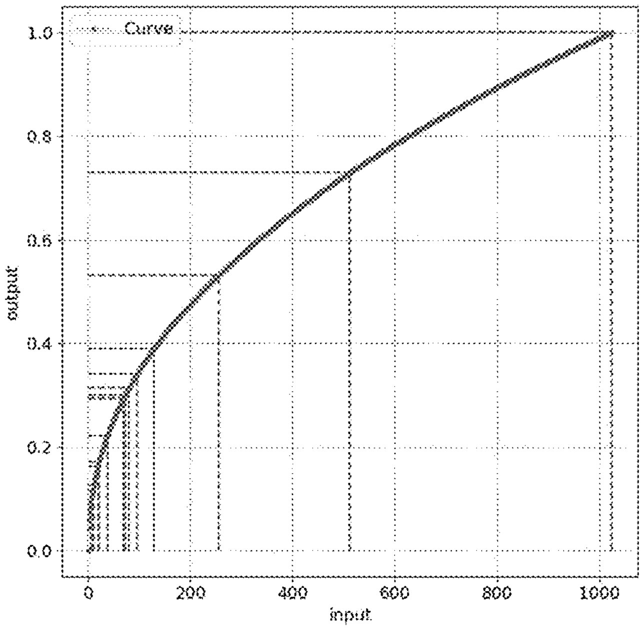
FIG. 10 shows the result of applying the segment points of the target discrete function to the gamma function in accordance with an embodiment of the present disclosure.

Finally, the obtained segment points of the target discrete function will be applied to the gamma function. FIG. 10 shows an example of the result of such operation. It can be seen from FIG. 10 that the gamma function curve has been divided into segments with ideal intervals. The slope changes faster in the first half of the curve than the second half. Accordingly, the first half of the curve has more sampling points than the second.

Optionally, after determining the coordinates of the segment points of the target discrete function, the method also includes Step 11 to Step 14.

Step 11: finding the x-coordinate where the data point of the target discrete function has a greatest difference from the segment point-based interpolation result.

It should be noted that step 11 specifically includes comparing the parameters of the target discrete function with the parameters obtained by segment point-based interpolation, and finding the x-coordinate where the greatest difference occurs.

Step 12: adding a sampling point to the segment where the x-coordinate is located, wherein the sampling point divides the interval of the segment in half.

The end points of the segment are two adjacent segment points; the interval of the segment indicates the distance between two adjacent sampling points; the segment points also serve as sampling points; initially, the interval of the segment indicates the distance between two segment points.

For example, the x-coordinate with the greatest difference lies in the segment between the first and second segment points. The x-coordinate of the first segment point is 1024, and the x-coordinate of the second segment point is 2048. If there is no sampling point between the first and second segment points, the interval between the first and second segment points is 2048-1024=1024. At this time, a sampling point is added, so the interval of this segment is divided in half. The x-coordinate of the new sampling point is 1536.

When there is one sampling point between the first and second segment points, the interval from the first segment point to the sampling point, and from the sampling point to the second segment point is 512. If two new sampling points are added, the intervals are once again halved. The x-coordinates of the two new sampling points are 1280 and 1792 respectively.

Step 13: finding the x-coordinate where the data point of the target discrete function has a greatest difference from the segment point-based interpolation result.

In Step 13, the interpolation calculation for the newly added segment point is carried out.

Step 14: adding a sampling point in the segment of the x-coordinate where the greatest difference occurs, wherein the sampling point divides the interval of the segment in half.

It should be noted that the implementation of Step 14 is the same as that of Step 12 and is not repeated here.

In some embodiments, the aforementioned step may further include: determining whether the number of sampling points reaches the preset number; if the preset number is not reached, the x-coordinate where the data point of the target discrete function has a greatest difference from the segment point-based interpolation result will continue to be found. Then, a sampling point will be added on the segment of the x-axis where the greatest difference occurs, wherein the sampling point divides the interval of the segment in half.

It should be noted that the preset number is a preconfigured number of the maximum number of sampling points required (MaxEntry). The value of MaxEntry can be set according to the actual situation. For example, this number may be 20, 30, or 50, which is not limited herein. If the number of sampling points reaches the preset number, the insertion of sampling points stops.

It can be seen that the accuracy of the LUT generated can be improved through the aforementioned secondary point insertion approach without the addition of segment points.

After the aforementioned step of secondary point insertion is carried out, the LUT is generated accordingly based on the coordinates of the segment points of the target discrete function. Specifically, the LUT is generated based on the coordinates of the segment points of the target discrete function and the interval of each segment.

It should be noted that an example of LUT generation based on the coordinates of the segment points of the target discrete function and the interval of each segment can be seen in Table 1, and the details of which are not be repeated here.

Optionally, LUT generation based on the coordinates of the segment points of the target discrete function and the interval of each segment may specifically include: judging whether the intervals of two adjacent segments are the same in length; if they are the same, the segment point between the two adjacent segments is deleted; the LUT is generated based on the coordinates of the remaining segment points of the target discrete function and the interval of each remaining segment.

After secondary point insertion, many adjacent segments will have the same interval. In this case, adjacent segments with the same interval can be filtered out and the sampling point in between can be deleted to save register resources. This step specifically includes judging from start to the end whether the intervals of every two adjacent segments are the same. If the intervals are the same, the segment point between the two adjacent segments is deleted, and the number of segments (Count) is subtracted by one (Count−1).

For example, suppose that after secondary point insertion, the intervals of the first and the second segment are both 64. In this case, the first segment and the second segment can be merged, that is, the segment point between the first segment and the second segment can be deleted. In this way, the number of segment points can be reduced and register resources can be saved.

Figure 11:
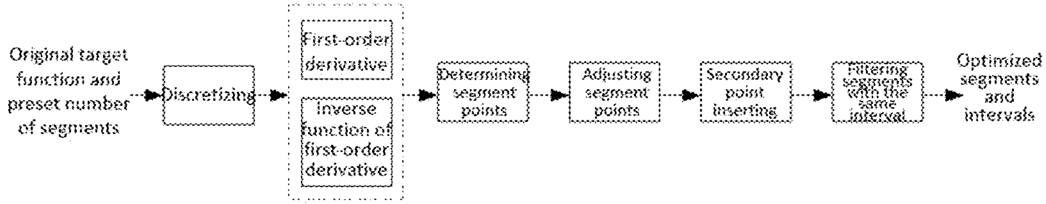
FIG. 11 illustrates the process of self-adaptive LUT generation in accordance with an embodiment of the present disclosure.

FIG. 11 provides a schematic diagram of the complete process of self-adaptive LUT generation in accordance with an embodiment of the present disclosure. First, the target discrete function and the preset number of segments are obtained. Second, the original target function is discretized, and the first-order derivative as well as the inverse function of the first-order derivative are obtained. Third, the segment points are determined based on the first-order derivative and the inverse function of the first-order derivative. After that, the segment points are adjusted based on the location of the data points. Then, secondary point insertion is carried out. Finally, the segment points between two adjacent segments with same intervals are deleted so that optimal segment points and intervals are obtained.

Figure 12:
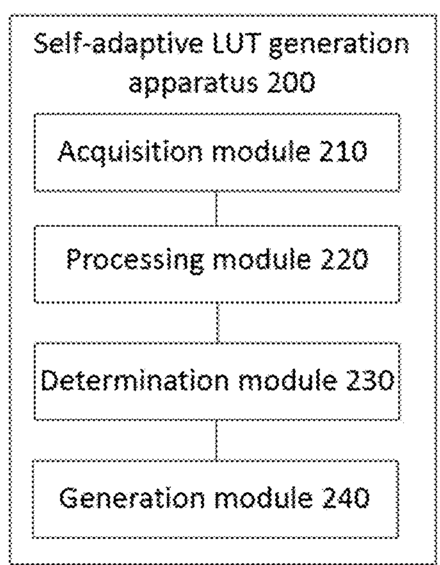
FIG. 12 is a block diagram of a self-adaptive LUT generation apparatus in accordance with an embodiment of the present disclosure.

Referring to FIG. 12, based on the same inventive concept, an embodiment of the present disclosure also provides a self-adaptive LUT generation apparatus 200, which includes:

An acquisition module 210 for acquiring the target discrete function configured in a specific functional unit for task processing.

A processing module 220 for processing the target discrete function to obtain its first-order derivative.

A determination module 230 for determining the coordinates of the segment points of the target discrete function based on the first-order derivative and the preset number of segments.

A generation module 240 for generating an LUT based on the coordinates of the segment points of the target discrete function.

Optionally, the determination module 230 is specifically used for evenly segmenting the y-axis of the first-order derivative based on the preset number of segments; this module also determines the coordinates of the segment points of the target discrete function based on the coordinates of the segment points of the first-order derivative, wherein the coordinates of the segment points of the first-order derivative are the coordinates of the segment points of the target discrete function; the coordinates of the segment points of the first-order derivative are obtained by evenly segmenting the x-axis of the inverse function of the first-order derivative based on the preset number of segments.

The target discrete function consists of N discrete data points; optionally, the determination module 230 is also specifically used for moving the segment points of the first-order derivative to data points of the first-order derivative to obtain the target segment points of the first-order derivative, wherein the target segment points of the first-order derivative are in the same order as the segment points of the first-order derivative; the coordinates of the target segment points of the first-order derivative are the coordinates of the segment points of the target discrete function.

With reference to the technical solution provided in the second aspect, in some possible implementations, the determination module 230 is further used for determining whether the segment points of the first-order derivative are on the data points; if a segment point is on a data point, the segment point is determined as a target segment point of the first-order derivative; if not, the segment point is moved to a data point, so that the segment point at the new location is determined as the target segment point of the first-order derivative.

Optionally, after the segment points of the first-order derivative are moved to the data points of the first-order derivative to obtain the target segment points of the first-order derivative, the determination module 230 is further used for evenly segmenting the y-axis of the first-order derivative to the right side of a target segment point to form new segment points, and determining these new segment points as segment points of the first-order derivative. The number of even segments on y-axis is the preset number of segments minus m, and m equals the number of segmentation times minus 1.

Optionally, the determination module 230 is yet responsible for determining the coordinates of the initial segment points of the first-order derivative based on the first-order derivative and the preset number of segments. The determination module also judges whether the difference between the coordinates of two adjacent initial segment points in the first-order derivative is a power of two. If it is not, a new segment point is inserted between the adjacent initial segment points, so that the difference between the coordinates of any two adjacent segment points after the insertion of the new segment point is a power of two. This module then determines the coordinates of the segment points of the target discrete function, wherein the segment points of the target discrete function include the initial segment points on the first-order derivative and the new segment points on the first-order derivative.

Optionally, the said apparatus also includes a secondary point insertion module. After the coordinates of the segment points of the target discrete function are determined, this secondary point insertion module finds the x-coordinate where the data point of the target discrete function has a greatest difference from the segment point-based interpolation result. The module then adds a sampling point to the segment where the x-coordinate is located, wherein the sampling point divides the interval of the segment in half. The endpoints of the segment are two adjacent segment points; the interval of the segment indicates the distance between two adjacent sampling points. Initially, the interval of the segment indicates the distance between two segment points; after finding the x-coordinate where the data point of the target discrete function has a greatest difference from the segment point-based interpolation result, a sampling point is added to the segment where the x-coordinate is located, wherein the sampling point divides the interval of the segment in half.

Optionally, the secondary point insertion module is also used for determining whether the number of sampling points reaches the preset number; if the preset number is not reached, the x-coordinate where the data point of the target discrete function has a greatest difference from the segment point-based interpolation result will continue to be found. Then, a sampling point will be added on the segment of the x-axis where the greatest difference occurs, wherein the sampling point divides the interval of the segment in half.

Optionally, the generation module 240 is used for generating LUTs based on the coordinates of the segment points of the target discrete function and the interval of each segment.

Optionally, the generation module 240 is also used for judging whether the intervals of two adjacent segments are the same in length. If they are the same, the segment point between the two adjacent segments is deleted. The LUT is generated based on the coordinates of the remaining segment points of the target discrete function and the interval of each remaining segment.

It should be noted that as will be clearly appreciated by those skilled in the art, the specific operating processes of the system, apparatus, and units described above may be performed with reference to the corresponding processes in the foregoing embodiment of the method and therefore will not be described in detail herein for ease and brevity of the description.

Based on the same inventive concept, an embodiment of the present disclosure further provides a computer-readable storage medium storing a computer program that, when run, executes the method provided in the foregoing embodiment.

The storage medium may be any available medium that can be accessed by a computer, or a data storage device such as a server or a data center integrated with one or more available medium. The available medium may be a magnetic medium (e.g., a floppy disk, a hard disk, or a magnetic tape), an optical medium (e.g., a DVD), or a semiconductor medium (e.g., a solid state disk), or the like.

In an embodiment of the present disclosure, it should be understood that the disclosed device and method may be implemented in other manners. The embodiments of the device described above are only illustrative. For example, the division of the unit is only a logical function division. In actual implementation, there may be other division methods. Another example is that multiple units or components may be combined or integrated into another system, and some features can be ignored or not implemented. In addition, the shown or discussed mutual coupling, direct coupling, or communication connection may be implemented through communication interfaces. Indirect coupling or communication connection of devices or units may be in electrical, mechanical, or other forms.

In addition, the units described as separate components may be or not be separated physically. The components illustrated as units may be or not be physical units. In other words, they may be located at one place or they may be distributed onto multiple network units. Some or all of the units may be selected as actually required to achieve the objectives of the solutions of the present embodiments.

Besides, the individual functional modules in the embodiments of the present disclosure may be integrated together to form an independent part, or each of the modules may be physically stand-alone, or two or more of the modules may be integrated into an independent part.

Relationship terms such as first, second, and the like are used herein only for distinguishing one entity or operation from another entity or operation, while it is not necessarily required or implied that these entities or operations have any such practical relationship or order.

The above description is merely illustrative of the embodiments of the present disclosure and is not intended to limit the scope of protection of the present disclosure. It will be understood by those skilled in the art that various modifications and variations may be made to the present disclosure. Any modifications, equivalent alternatives, improvements and so on made within the spirit and principle of the present disclosure are intended to be encompassed within the scope of protection of the present disclosure.

The invention claimed is:

1. A method for self-adaptive look-up-table (LUT) generation, comprising:

obtaining a target discrete function configured in a specific functional unit for task processing;

processing the target discrete function to obtain a first-order derivative of the target discrete function;

determining coordinates of segment points of the target discrete function based on the first-order derivative and a preset number of segments; and generating the LUT based on the coordinates of the segment points of the target discrete function, wherein determining the coordinates of the segment points of the target discrete function based on the first-order derivative and the preset number of segments comprises:

evenly segmenting a y-axis of the first-order derivative based on the preset number of segments; and determining the coordinates of the segment points of the target discrete function based on coordinates of segment points of the first-order derivative, wherein the coordinates of the segment points of the first-order derivative are the coordinates of the segment points of the target discrete function; the coordinates of the segment points of the first-order derivative are obtained by evenly segmenting an x-axis of an inverse function of the first-order derivative based on the preset number of segments, wherein the y-axis represents outputs of the target discrete function, and the x-axis represents inputs of the target discrete function.

2. The method of claim 1, wherein the target discrete function consists of N discrete data points and determining the coordinates of the segment points of the target discrete function based on the coordinates of the segment points of the first-order derivative comprises:

moving the segment points of the first-order derivative to data points of the first-order derivative to obtain the target segment points of the first-order derivative; and the target segment points of the first-order derivative are in a same order as the segment points of the first-order derivative; the coordinates of the target segment points of the first-order derivative are the coordinates of the segment points of the target discrete function.

3. The method of claim 2, wherein moving the segment points of the first-order derivative to the data points of the first-order derivative to obtain the target segment points of the first-order derivative comprises:

determining whether the segment points of the first-order derivative are on the data points;

if the segment points are on the data points, the segment points of the first-order derivative are determined as the target segment points of the first-order derivative; and if not, the segment points of the first-order derivative are moved to the data points of the first-order derivative, so that the target segment points of the first-order derivative are determined.

4. The method of claim 3, wherein moving the segment points of the first-order derivative to the data points of the first-order derivative to obtain the target segment points of the first-order derivative further comprises:

evenly segmenting the y-axis of the first-order derivative to a right side of a target segment point to form new segment points, and determining these new segment points as segment points of the first-order derivative, wherein the number of even segments on y-axis is the preset number of segments minus m, and m equals a number of segmentation times minus 1.

5. The method of claim 1, wherein determining the coordinates of the segment points of the target discrete function based on the first-order derivative and the preset number of segments comprises:

determining the coordinates of an initial segment points of the first-order derivative based on the first-order derivative and the preset number of segments;

judging whether a difference between the coordinates of two adjacent initial segment points in the first-order derivative is a power of two;

if it is not, a new segment point is inserted between the adjacent initial segment points, so that the difference between the coordinates of any two adjacent segment points after the insertion of the new segment point is a power of two; and determining the coordinates of the segment points of the target discrete function, wherein the segment points of the target discrete function include the initial segment points on the first-order derivative and the new segment points on the first-order derivative.

6. The method of claim 5, further comprising after the coordinates of the segment points of the target discrete function are determined:

finding an x-coordinate where a data point of the target discrete function has a greatest difference from a segment point-based interpolation result;

adding a sampling point to the segment where the x-coordinate is located, wherein the sampling point divides an interval of the segment in half, wherein endpoints of the segment are two adjacent segment points; the interval of the segment indicates distance between two adjacent sampling points, wherein initially, the interval of the segment indicates the distance between two segment points;

finding the x-coordinate where the data point of the target discrete function has a greatest difference from the segment point-based interpolation result; and adding a sampling point to the segment where the x-coordinate is located, wherein the sampling point divides the interval of the segment in half.

7. The method of claim 6, further comprising:

determining whether a number of sampling points reaches the preset number;

if the preset number is not reached, the x-coordinate where the data point of the target discrete function has a greatest difference from the segment point-based interpolation result will continue to be found; and adding sampling points on the segment of the x-axis where the greatest difference occurs, wherein a sampling point divides the interval of the segment in half.

8. The method of claim 6, wherein generating the LUT based on the coordinates of the segment points of the target discrete function comprises:

generating the LUT based on the coordinates of the segment points of the target discrete function and the interval of each segment.

9. The method of claim 8, wherein generating the LUT based on the coordinates of the segment points of the target discrete function and the interval of each segment comprises:

judging whether the intervals of two adjacent segments have a same length;

if their length is the same, the segment point between the two adjacent segments is deleted; and generating the LUT based on the coordinates of remaining segment points of the target discrete function and the interval of each remaining segment.

10. An apparatus for self-adaptive look-up-table (LUT) generation, comprising:

an acquisition module for acquiring a target discrete function configured in a specific functional unit for task processing;

a processing module for processing the target discrete function to obtain a first-order derivative of the target discrete function;

a determination module for determining coordinates of segment points of the target discrete function based on the first-order derivative and a preset number of segments; and a generation module for generating LUTs based on the coordinates of segment points of the target discrete function, wherein the determination module is specifically used for evenly segmenting a y-axis of the first-order derivative based on the preset number of segments, and determining the coordinates of the segment points of the target discrete function based on the coordinates of the segment points of the first-order derivative, wherein the coordinates of the segment points of the first-order derivative are the coordinates of the segment points of the target discrete function; the coordinates of the segment points of the first-order derivative are obtained by evenly segmenting an x-axis of an inverse function of the first-order derivative based on the preset number of segments, wherein the y-axis represents outputs of the target discrete function, and the x-axis represents inputs of the target discrete function.

11. The apparatus of claim 10, wherein the target discrete function consists of N discrete data points, and the determination module is also used for moving the segment points of the first-order derivative to data points of the first-order derivative to obtain the target segment points of the first-order derivative, wherein the target segment points of the first-order derivative and the segment points of the first-order derivative have a similar order; the coordinates of the target segment points of the first-order derivative are the coordinates of the segment points of the target discrete function.

12. The apparatus of claim 11, wherein the determination module is further used for determining whether the segment points of the first-order derivative are on the data points; if a segment point is on a data point, the segment point is determined as a target segment point of the first-order derivative; if not, the segment point is moved to a data point, so that the segment point moved to the data point is determined as the target segment point of the first-order derivative.

13. The apparatus of claim 12, wherein the determination module is also used for moving the segment points of the first-order derivative to the data points of the first-order derivative, wherein after the target segment points of the first-order derivative are obtained, the y-axis of the first-order derivative to a right of the target segment points will be evenly segmented to form new segment points, wherein the new segment points are then determined as the segment points of the first-order derivative, wherein the number of even segments on y-axis is the preset number of segments minus m, and m equals a number of segmentation times minus 1.

14. The apparatus of claim 10, wherein the determination module is further responsible for determining the coordinates of initial segment points of the target discrete function based on the first-order derivative and the preset number of segments, wherein the determination module also judges whether a difference between the coordinates of two adjacent initial segment points in the first-order derivative is a power of two; if it is not, a new segment point is inserted between the adjacent initial segment points, so that the difference between the coordinates of any two adjacent segment points after the insertion of the new segment point is a power of two, wherein this module then determines the coordinates of the segment points of the target discrete function, wherein the segment points of the target discrete function include the initial segment points on the first-order derivative and the new segment points on the first-order derivative.

15. The apparatus of claim 14 further comprises a secondary point insertion module, wherein after the coordinates of the segment points of the target discrete function are determined, this secondary point insertion module finds an x-coordinate where a data point of the target discrete function has a greatest difference from a segment point-based interpolation result, wherein the module then adds a sampling point to the segment where the x-coordinate is located, wherein the sampling point divides an interval of the segment in half, wherein endpoints of the segment are two adjacent segment points; the interval of the segment indicates a distance between two adjacent sampling points, wherein initially, the interval of the segment indicates a distance between two segment points; after finding the x-coordinate where the data point of the target discrete function has a greatest difference from the segment point-based interpolation result, a sampling point is added to the segment where the x-coordinate is located, wherein the sampling point divides the interval of the segment in half.

16. The apparatus of claim 15, wherein the secondary point insertion module also determines whether a number of sampling points reaches the preset number; if the preset number is not reached, the x-coordinate where the data point of the target discrete function has a greatest difference from the segment point-based interpolation result will continue to be found, then, a sampling point will be added on the segment of the x-axis where the greatest difference occurs, wherein the sampling point divides the interval of the segment in half.

17. The apparatus of claim 15, wherein the generation module generates LUTs based on the coordinates of the segment points of the target discrete function and the interval of each segment.

18. An electronic device, comprising a processor and a memory, wherein the processor and the memory are connected;

the memory is used for storing programs; and the processor is used for calling the programs stored in the memory, and executes the methods in accordance with claim 1.

* * * * *